April 17, 1962  C. J. GAMBARDELLA  3,029,862
TIRE DEMOUNTING APPARATUS
Filed July 8, 1959  2 Sheets-Sheet 1

INVENTOR.
Carmine J. Gambardella
BY
Elliot A. Salter
Attorney.

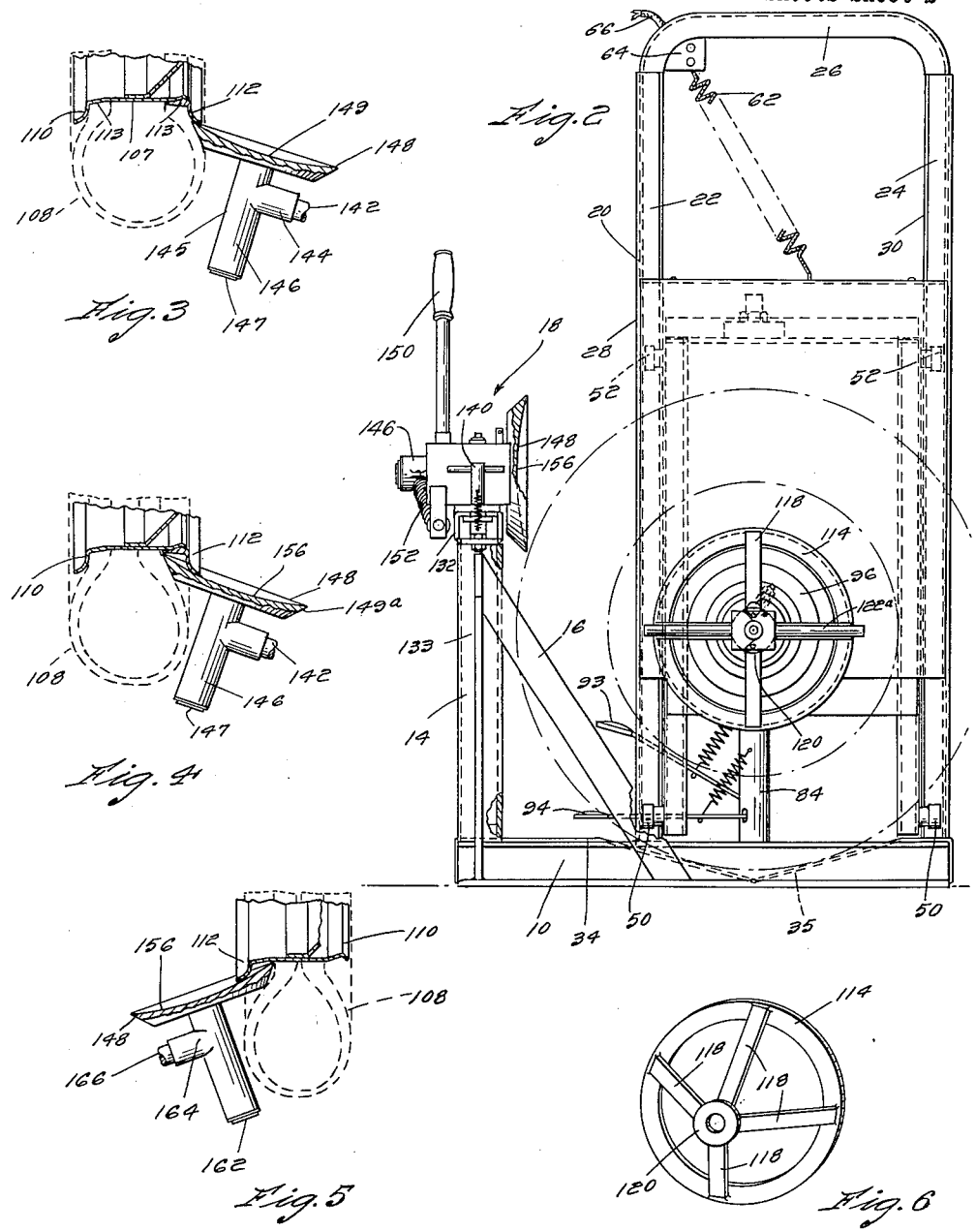

United States Patent Office
3,029,862
Patented Apr. 17, 1962

3,029,862
TIRE DEMOUNTING APPARATUS
Carmine J. Gambardella, Warwick, R.I., assignor to Lee Engineering Company, Pawtucket, R.I., a corporation of Rhode Island
Filed July 8, 1959, Ser. No. 825,724
9 Claims. (Cl. 157—1.24)

The present invention relates to tire demounting apparatus. More particularly, the present invention relates to apparatus for easily and quickly removing large vehicular pneumatic tires from the rims thereof.

Most large vehicular equipment in use today utilizes tires that are of such size as to be difficult to remove from their rims by conventional equipment. These oversize tires are normally mounted on the so-called lock-rim or loose-flange type of rim, and accordingly, the present invention is directed primarily toward equipment for use in demounting pneumatic tires from the loose-flange type of rim. It is understood, of course, that the invention is not limited for use with tires mounted on the loose-flange rim but may be employed for demounting tires from conventional types of rims, such as the so-called drop-center rim, for example. Also, this apparatus is effective for removing tubeless tires, as well as tires with tubes.

The lock-rim or loose-flange type of rim is normally utilized with large vehicles, such as all off-the-road equipment, tractors, trucks and airplanes, and is formed in two coacting sections, one section defining the main body of the rim for receiving the tire thereon, and the other section defining a removable locking flange that is adapted to lock the tire on the said main rim section.

One of the obstacles encountered in removing tires from either the loose-flange type of rim or the drop-center type of rim is the necessity for breaking the seal or bead between the rim and the inner peripheral edge of the tire. Because of the accumulation of dirt, mud and grease, as well as the inherent tightness of the seal where tubeless tires and the like are being used, the bead between the tire and rim is difficult to break and, if conventionally known equipment is utilized, considerable labor, effort and time is required to perform the tire demounting operation. Moreover, since the tires for use with tractors, airplanes and trucks are of such large size, they are difficult to maneuver and handle during the tire removing operation. It has been estimated that by using the prior known equipment, it normally takes from two to twenty-four hours to remove a single tire. The present invention, which utilizes semi-automatic equipment for removing the tire from the loose-flange type of rim can successfully demount approximately sixteen tires in thirty minutes.

Briefly, the present invention comprises a vertically adjustable mounting or wheel cone on which the assembled rim and tire are rotatably mounted. A hydraulically actuated disc positioned forwardly of the assembled rim and tire is adapted to engage the tire adjacent the rim for breaking the front bead between the rim and the tire and for forcing the tire rearwardly on the rim whereby to enable disengagement of the removable section of the loose-flange rim. A second hydraulically actuated disc positioned rearwardly of the assembled rim and tire is then adapted to engage the rear wall of the tire, break the rear bead, and upon forward movement of the disc slide the tire from engagement with the rim.

It therefore is an object of the present invention to provide tire removing apparatus that is adapted to quickly and easily remove tires from large vehicular wheels.

Another object of the present invention is to provide tire removing apparatus of particular value in connection with the lock-rim or loose-flange type of wheels, and which is semi-automatic in operation.

Still another object of the present invention is to provide tire demounting apparatus for vehicular wheels that includes means for adjustably mounting the wheel assembly in accordance with the size thereof.

Still another object is to provide hydraulically actuated tire engaging discs that are positioned forwardly and rearwardly of the assembled tire and wheel and that are adapted to break the bead between the tire and the rim and then automatically force the tire from the rim.

Still another object is to provide dish-shaped tire removing discs that are formed with tapered edges for more effectively breaking the bead between the tire and the rim.

Other objects and the nature and advantages of the instant invention will be apparent from the following description taken in conjunction with the accompanying drawings, wherein:

FIG. 2 is a front elevational view of the tire demounting apparatus illustrated in FIG. 1;

FIG. 3 is a fragmentary sectional view illustrating the position of the forward bead breaking disc as it initially contacts the assembled rim and tire for breaking the bead therebetween;

FIG. 4 is a view similar to FIG. 3 showing the advanced position of the forward bead breaking disc as it forces the tire rearwardly of the removable section of the loose-flange rim;

FIG. 5 is a view similar to FIGS. 3 and 4 showing the position of the rearwardly positioned tire removing disc as it contacts the tire prior to removing the tire from the rim; and FIG. 6 is a perspective view of the wheel pressure ring for locking the assembled rim and tire on the wheel cone.

Figure 1:
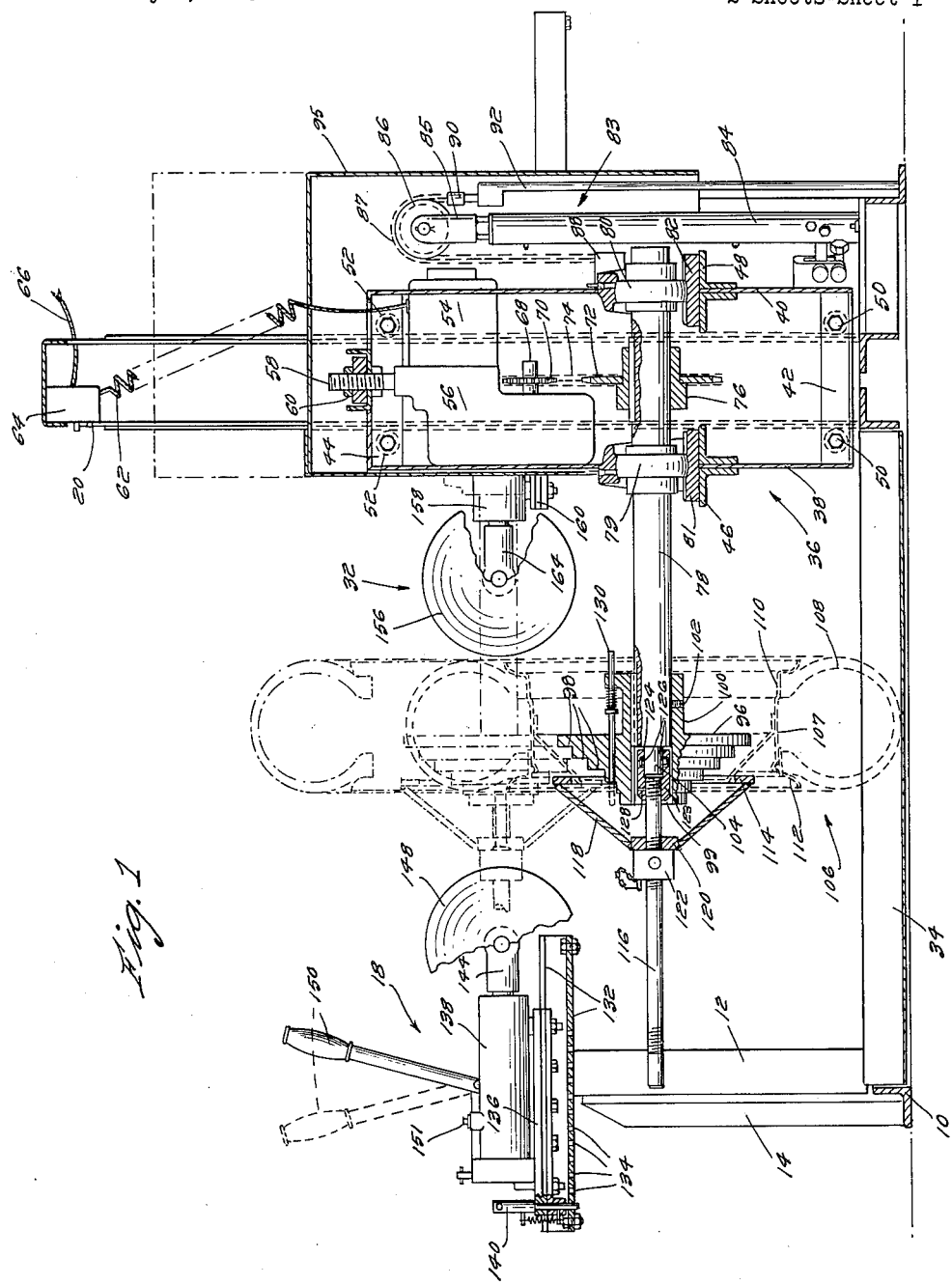
FIG. 1 is an elevational view of the tire demounting apparatus embodied in the present invention with parts shown in section and the demounting position of the wheel carrying member being shown in dotted lines.

Referring now to the drawings and particularly to FIG. 1, the tire demounting apparatus embodied in the present invention is illustrated therein and includes a frame assembly comprising a base 10 formed of welded angle stock and having a generally rectangular configuration. Mounted on the forward left-hand corner of the base 10 as seen in FIGS. 1 and 2 and extending upwardly therefrom is a tubular standard 12. The tubular standard 12 is secured in position by a vertical bracket 14 welded to the base 10 and to the tubular standard. An angularly disposed support 16 engages the bracket 14 and the base 10 and aids in securing the tubular standard 12 in the vertical position thereof. Swively or pivotally mounted in the tubular standard 12 is a hydraulically actuated bead breaking assembly, generally indicated at 18, the component parts of which will be described in detail hereinafter.

Referring again to both FIGS. 1 and 2, the frame assembly is shown further comprising a vertical lift frame 20 mounted on the base 10. The lift frame 20 is formed in an inverted U-configuration and includes side members 22, 24 integrally joined to a top portion 26. Secured to the side members 22, 24 and extending the length thereof are tracks 28, 30, the purpose of which will be described hereinafter. Although not shown in the drawings, a tubular standard similar to tubular standard 12 is secured to the base 10 on the right side of FIG. 1 rearwardly of the lift frame 20. Pivotally mounted in the last-mentioned tubular standard is a hydraulically actuated tire removing assembly generally indicated at 32 (FIG. 1), the component parts and the operation of which will be described hereinafter.

Mounted on the base 10 and extending from the left side thereof to the lift frame 20, as seen in FIG. 1, is a tire centering platform 34. As shown in FIG. 2, the tire centering platform extends across the width of the base 10 and is formed with a V-shaped depression or well 35 shown in dotted lines in FIG. 2. The platform 34 may be formed of sheet metal material that is sufficiently rigid to accommodate a heavy-duty oversize vehicle wheel thereon. It is seen that by forming the platform 34 with the V-shaped well 35, the wheel assembly from which the tire is to be demounted can be conveniently centered in upright position thereon while the demounting apparatus is being prepared to receive the wheel assembly.

The tire demounting apparatus embodied herein is semi-automatic in operation and includes motor operated means for continuously rotating the wheel assembly from which the tire is to be demounted. As shown in FIG. 1, a power frame assembly generally indicated at 36 is mounted for vertical movement on the lift frame 20 and is adapted to carry the means for rotating the wheel assembly. The power frame assembly 36 comprises a vertically disposed rectangularly shaped frame that includes spaced vertical struts 38 and 40 which are joined by a lower horizontal support bracket 42 and an upper horizontal support bracket 44. Bearing supports 46, 48 are secured to the vertical struts and are adapted to accommodate bearings of the power assembly, as will be described hereinafter. The power frame assembly 36 is adjustable in the vertical position thereof and for this purpose is provided with lower rollers 50 that are rotatably secured to the lower horizontal support 42 and upper rollers 52 that are rotatably secured to the upper horizontal support 44. The rollers 50, 52 engage the outer surfaces of the tracks 28, 30 of the lift frame 20 which define guides for the vertical movement of the power frame assembly 36. It is seen that the rollers 50, 52 will enable the power frame assembly 36 to be vertically moved with a minimum of frictional resistance.

In order to rotate the wheel assembly from which the tire is to be demounted, an electric motor 54 is provided and is mounted on the upper horizontal support 44 of the frame assembly 36 together with a transmission 56 with which the motor 54 is coupled. An extension bolt 58 extends upwardly from the transmission 56 and is locked to the upper horizontal support 44 by a nut assembly 60. Power is supplied to the electric motor 54 through a cord 62 which is connected to a junction box 64 mounted on the inside surface of the top portion 26 of the lift frame 20. A conductor 66 is connected to the box 64 and is conveniently connected to a suitable source of electrical power. Extending outwardly from the transmission 56 is an output shaft 68 on which a sprocket gear 70 is mounted. The sprocket gear 70 drivingly engages a gear 72 through a sprocket chain 74, the gear 72 in turn being secured to a hub 76 that is splined to a power shaft 78. The shaft 78 is rotatably journalled in the power frame assembly 36 by means of self-aligning bearing assemblies 79, 80, the bearing assemblies 79, 80 being supported within the bearing blocks 81, 82, respectively. As seen in FIG. 1, the bearing blocks 81, 82 are mounted on the bearing supports 46, 48 which are secured to the vertical struts 38, 40 of the power frame assembly 36. As a result of this assembly, any deflection of the shaft 78 under load will be compensated for by the self-aligning bearings 79, 80, whereby shaft 78 is always free for rotation.

In order to elevate the power frame assembly 36 together with the power shaft 78, a hydraulic lift assembly, generally indicated at 83, is provided and includes a hydraulic cylinder 84 mounted in vertical position on the base 10. The hydraulic cylinder 84 has a piston (not shown) disposed therein that is secured to a piston rod, the piston rod terminating in an extension 85 at the upper end thereof. Secured to the extension 85 is a pulley 86 about which a sprocket chain 87 extends. One end of the sprocket chain 87 is secured to a block 88 that is joined to the power frame assembly 36, while the other end of the chain 87 is secured to a post 90 fixed to a vertical support member 92, the vertical support member 92 being mounted on the base 10.

As shown in FIG. 2, control pedals 93 and 94 are operatively associated with the hydraulic cylinder 83 and are adapted to be depressed by the operator to control the vertical movement of the piston located within the cylinder 83. More specifically, one of the control pedals is pumped to force fluid into the cylinder to cause raising of the piston, while the other pedal operates a release valve (not shown) which enables the piston to lower. It is therefore seen that by depressing the appropriate control pedal 93 or 94, the piston located within the cylinder 83 will be moved upwardly together with the extension 85 and the pulley 87. The entire power frame assembly 36 is then moved upwardly therewith through the interconnection of the chain 87 and the block 88. The horizontal position of the power shaft 78 is thereby elevated and will move a wheel assembly mounted thereon to the demounting position thereof, as will be described hereinafter. As shown in FIG. 1, a housing 95 encloses the upper portion of the power frame assembly 36 and the lifting apparatus and is mounted over the power frame assembly for movement therewith. It is seen that the housing 95 serves to enclose the drive assembly for the shaft 78, providing a convenient panel for identifying the apparatus and further forming an attractive cover for the power components, which also helps maintain these components free from dirt and dust.

In order to position a wheel assembly in the demounting position, a wheel cone 96 is provided and is mounted on the outer end of the shaft 78. The wheel cone 96 is formed with a plurality of stepped annular flanges 98 that graduate with respect to their diameter, each of the flanges 98 being adapted to accommodate a different size wheel. A bore 99 is formed in the wheel cone 96 into which the shaft 78 extends, a hub 100 being joined to the annular flanges 98 rearwardly thereof and receiving a set screw 102 for locking the wheel cone on the shaft 78. The outer end of the shaft 78 only extends a portion of the way through the bore 99 of the wheel cone 96 and terminates in a reduced portion 104.

A wheel assembly, generally indicated at 106, is adapted to be mounted on the wheel cone 96 and in this instance includes a rim 107 and a tire 108 mounted thereon. The rim 107 is of the loose-flange type and is formed with a rim main rim section 110 and a removable flange or locking section 112. As shown in FIGS. 3 through 5, the exterior surfaces of the sections 110 and 112 of the rim 107 are formed with portions 113 tapered at approximately five degrees on which the front and rear beads of tire 108 normally seat.

In order to lock the wheel assembly 106 on the wheel cone 96, a wheel pressure ring 114 is provided and cooperates with a spindle 116 to secure the wheel assembly in position. It is understood that the size of the rim and tire that comprise the wheel assembly 106 will determine on which of the annular flanges 98 the wheel assembly will be mounted. As shown in FIG. 6, the pressure ring 114 includes a spider construction defined by a plurality of arms 118 that are joined to a central ring 120, the central ring 120 being adapted to receive the spindle 116 therein. A locking collar 122 threadably engages the spindle 116 and is adapted to lock the pressure ring 114 in position against the tire rim, whereby the wheel assembly is rigidly clamped on to the cone 96. The spindle 116 extends into the bore 99 of the wheel cone 96 and is connected to the shaft 78 in axial alignment therewith by coupling 123. The coupling 123 is formed with a bayonet slot 124 for receiving lugs 126, the lugs 126 being secured to the reduced portion 104 of the shaft 78. A pin 128 fixes the coupling 123 to the spindle 116 whereby bayonet slots 124 and lugs 126 cooperate to releasably lock spindle 116 and shaft 78 in the aforesaid axial alignment. Once this releasable lock has been effected, collar 122 is rotated to force ring 114 against the tire rim to clamp the latter on cone 96. Turning of collar 122 is facilitated by arms 122a.

When small diameter tires are to be demounted by the apparatus embodied herein, the wheel assembly thereof will be mounted on the smallest diameter flange 98 of the wheel cone 96. Since these small diameter wheel assemblies cannot be conveniently held against rotation on the smallest flange 98 of the wheel cone 96, a spring actuated retractable pin 130 is provided. The retractable pin 130 is mounted on the wheel cone 96 and extends through a passage formed in the body thereof and is adapted to extend through a suitable opening formed in the small diameter wheel and thus acts to prevent any relative rotation between the wheel and cone 96 during the demounting operation.

In removing the tire 108 from the main rim 110, a two-step operation is required. It is first necessary to break the front bead between the removable flange 112 and the tire 108 and then force the tire rearwardly until it clears the removable flange. The removable flange 112 is then removed, after which the rear bead is broken and then the tire 108 is forced forwardly off the now unobstructed front edge of the rim. In order to break the bead between the rim and tire and then remove the loose flange rim 112, the bead breaking assembly 18 is provided and, as shown in FIGS. 1 and 2, includes a base 132 which is mounted on a shaft 133 that is swively positioned in the tubular standard 12. The base 132 is formed with a plurality of spaced openings 134 which define positions of adjustment for the bead breaking assembly. Slidably associated with the base 132 is a support bracket 136 on which a hydraulic cylinder 138 is mounted. The bracket 136 is adapted to be longitudinally adjusted with respect to the base 132 and includes a spring biased pin 140 that extends through an opening formed adjacent the rear end thereof and through one of the openings 134 in the base 132. It is seen that by lifting the pin 140 and shifting the support bracket 136 forwardly with respect to the base 132, the position of the cylinder 138 with respect to the wheel assembly 106 will be adjusted. The pin 140 is then released for insertion into the adjacent opening 134 to lock the bracket 136 in the adjusted position thereof.

Extending outwardly of the cylinder 138 is a piston rod 142 (FIGS. 3, 4) to which an arm 144 of a T-shaped collar 145 is secured. Extending at right angles with respect to the arm 144 is an arm 146 in which a disc shaft 147 is rotatably mounted. A bead breaking disc 148 is secured to the shaft 147 for rotation therewith. As shown in FIGS. 3 and 4, the disc 148 is dish shaped in construction, having a concave inner surface 149 and being formed with a decreasing taper or bevel 149a along the peripheral edge thereof. As shown in FIG. 2, spring 152 is interconnected to the base 132 and to the arm 146 and is adapted to bias movement of the arm 146 when it is carried toward the tire by the piston rod 142. By pumping handle 150, pressure is built up in cylinder 138 so as to force piston rod 142, collar 145 and disc 148 toward the wheel assembly whereupon the edge of disc 148 is forced between the tire and rim, as illustrated most clearly in FIG. 3. It will be understood that the disc 148 is properly positioned with respect to wheel assembly 106 by rotatably adjusting the entire assembly 18 within tubular support 12. When it is desired to retract piston rod 142, a release valve 151 is actuated whereupon spring 152 automatically retracts said piston rod, while at the same time exhausting the cylinder 138.

The bead between the tire 108 and loose-flange section 112 is broken by the penetration of disc 148 therebetween, it being understood that the wheel assembly is all the while rotating about shaft 78 and that disc 148 is at the same time rotating about the axis defined by shaft 147, this latter rotation resulting from the frictional engagement between disc 148 and the rotating wheel assembly 106. Once the bead is broken, continued thrust of piston rod 142 and disc 148 forces the forward wall of tire 108 rearwardly until said wall completely clears the loose-flange section 112 whereby tire 108 is mounted solely on main rim 110. At this point, the piston rod 142 and disc 148 are retracted and the loose-flange section is manually removed from main rim section 110. During this operation, the weight and bulk of tire 108 will automatically cause the tire forward wall to retain its position on section 110.

In order to remove the tire from the main rim section 110, the rear tire removing assembly 32 is provided and as shown in FIGS. 1 and 5 is similar in construction to the aforedescribed bead breaking assembly 18. More specifically, the tire removing assembly 32 includes a disc 156 operatively connected to a hydraulic cylinder 158 mounted on a bracket 160. The bracket 160 is supported on a base (not shown) which is identical to the aforedescribed base 132. The bracket 160 and base therefor are swively mounted in a tubular standard (not shown) which, as mentioned hereinabove, is mounted on the right-hand side of the base 10, as seen in FIG. 1, and rearwardly of the power frame and lift assemblies. As shown in FIG. 5, the disc 156 is identical in construction to the disc 148 and is secured to the end of shaft 162 which in turn is rotatably mounted in T-shaped collar 164, the collar 164 receiving a piston rod 166 in securing relation therewith. The piston rod 166 extends into the cylinder 158 and is adapted to be operated by a control handle similar to aforedescribed handle 150. It is seen that once the loose-flange section 112 of the rim 107 has been removed as aforedescribed, the disc 156 is then moved into engaging relation with the tire 108 to break the rear bead, as shown in FIG. 5. Continued forward thrust of the disc 156 by means of the associated hydraulic actuating mechanism will then cause the tire 108 to, in effect, "walk off" the main rim section 110.

*Operation*

The wheel assembly 106 from which the pneumatic tire 108 is to be demounted is positioned for mounting on the wheel cone 96 by first rolling it onto the platform 34 adjacent the wheel cone. The wheel cone 96 is then vertically adjusted so as to be in axial alignment with the wheel assembly 106, this adjustment being accomplished by operation of the hydraulic lift assembly 83 through actuation of the pedals 93 or 94. With the height of the wheel cone properly adjusted, the wheel assembly 106 is mounted thereon and fixed in position by the wheel pressure ring 114, it being understood that the size of the wheel will determine which flange 98 the rim seats on. Rotation of threaded locking collar 122 clamps ring 114 against rim 107 to lock the latter on cone 96, this being done after shaft 116 has been locked in axial alignment with shaft 78 by means of bayonet connection 124, 126. The power frame assembly 36, including the power shaft 78, wheel cone 96 and the wheel assembly 106, is then elevated by the lift assembly 83 to the position shown in dotted lines in FIG. 1. The apparatus is now in position for removing the tire 108 from the rim 107.

With the power frame assembly 36 elevated as shown, the motor 54 is energized, which causes the power shaft 78 to rotate the wheel cone 96 together with the wheel assembly 106 locked thereon. Since it is necessary that the wheel assembly 106 be rotated at a speed slow enough to allow the bead braking disc 148 and tire removing disc 156 to properly engage the junction of the rim and tire, the transmission 56 is stepped down so that the rotation of the power shaft is approximately four r.p.m. Cylinder 138 is then adjusted so as to place disc 148 in close proximity to the wheel assembly, this adjustment being accomplished by engaging pin 140 in the appropriate opening 134, and then the entire assembly 18 is rotated with respect to its tubular support 12 to properly position disc 148 in relation to the wheel assembly. The handle 150 is next operated to hydraulically force piston rod 142 and disc 148 into engagement with the wheel assembly whereby said disc is forced between the front wall of tire 108 and the edge of loose-flange section 112, as most clearly illustrated in FIG. 3. Since the disc 148 is dish shaped, tapering toward the periphery thereof, the relatively sharp peripheral edge projects under the outer edge of the loose-flange section 112 of the rim and engages the side wall of the tire. Continued forward pressure of the piston rod 142 causes the disc 148 to break the bead between the outer or front wall of the tire and flange section 112 and then force said outer wall rearwardly until it clears said loose-flange section. During this operation it is important to note that the specific configuration of disc 148 has proven to be highly desirable and effective, since without dished surface 149 there would not be sufficient clearance for the disc to continue to force tire 108 rearwardly, as will be obvious from FIG. 4, while the beveled and tapered edge 149a not only enables the disc to penetrate between the tire and the rim, but it also effects a firm, flat engagement with the outer wall of the tire, as shown clearly in FIGS. 3 and 4.

Once the outer wall of tire 108 has been forced rearwardly so as to clear loose-flange section 112, the disc 148 is retracted by operation of release valve 151 and spring 152 and flange section 112 is manually removed from rim 107. The rear bead breaking assembly 32 is then swung into position in the exact same manner as the aforedescribed assembly 18, so that disc 156 is positioned for engagement with the rear side of wheel assembly 106. Cylinder 158 is then operated to force disc 156 forwardly between the rear wall of tire 108 and the edge of main rim section 110, as shown most clearly in FIG. 5. This action severs the rear bead, and continued forward thrust of disc 156 causes tire 108 to "walk off" the now unobstructed rim section 110.

It is once again emphasized that the specific configuration of the discs 148 and 156 is of considerable importance to the successful and efficient operation of this apparatus. Also, the extreme adjustability and maneuverability of the assemblies 18 and 32 has proven to be highly desirable and advantageous. The fact that discs 148 and 156 are free to rotate during the bead breaking operation insures a smooth and relatively friction-free action, while the ease and rapidity with which the tire assembly can be mounted on the apparatus and properly adjusted further cooperates toward making this machine one which is capable of effectively accomplishing the objects hereinbefore enumerated.

While there is shown and described herein certain specific structure embodying the invention, it will be manifest to those skilled in the art that various modifications and rearrangements of the parts may be made without departing from the spirit and scope of the underlying inventive concept and that the same is not limited to the particular forms herein shown and described except in so far as indicated by the scope of the appended claims.

What is claimed is:

1. In apparatus for demounting a time from a wheel assembly, a base, a platform having a well for receiving the tire therein, a lift frame mounted on said base, a power frame assembly mounted on said lift frame for vertical movement thereon, said power frame assembly including a shaft, and motor means drivingly connected to said shaft for causing rotation thereof, means mounted on said base and operatively connected to said power frame assembly for elevating said power frame assembly on said lift frame, means mounted on the outer end of said shaft for receiving and locking said wheel assembly thereon, and means mounted for swivel movement about a vertical axis on said base adjacent said mounted wheel assembly for removing said tire therefrom, said last-named means including a bead breaking disc, the axis of which is horizontal in the position of use.

2. In apparatus for demounting a tire as set forth in claim 1, said lift frame including vertically extending tracks, said power frame assembly including rollers engaging said tracks for movement thereover when said power frame assembly is moved vertically with respect to said lift frame by said elevating means.

3. In apparatus for demounting a tire from a rim, a bead breaking assembly including a pivotally mounted base, a support fixed to said base, a cylinder mounted on said support, a piston rod movable within said cylinder and having a T-shaped collar secured to the outer end thereof, a shaft rotatably mounted in said collar at right angles with respect to said piston rod, a disc connected to said shaft, said disc having a generally dish-shaped configuration, the body thereof tapering toward the peripheral edge thereof, and means for adjusting the longitudinal position of said cylinder with respect to said support.

4. Apparatus for demounting a tire from a two-piece rim, said tire and rim defining a wheel assembly comprising means for supporting said wheel assembly, means for elevating said supporting means to a demounting position, said elevating means including a cylinder and piston movable therein, a pulley operatively connected to said piston, and means operatively interconnecting said pulley and supporting means, whereby movement of said piston and pulley causes said interconnecting means to vertically adjust said supporting means, means for rotating said supporting means, thereby rotating said wheel assembly, means pivotally movable about a vertical axis located at one side of said wheel assembly for breaking the bead between said rim and tire at one side and for forcing the tire toward the other side until the tire is positioned solely on one portion of the rim, and means pivotally movable about a vertical axis located at said other side of said wheel assembly for breaking the bead between the tire and rim at said other side and for forcing the tire off said one rim portion.

5. Apparatus for demounting a tire from a two-piece rim, said tire and rim defining a wheel assembly, comprising means for supporting said wheel assembly, means for elevating said supporting means to a demounting position, means for rotating said supporting means, thereby rotating said wheel assembly, means pivotally movable about a vertical axis located at one side of said wheel assembly for breaking the bead between said rim and tire at said one side and for forcing the tire toward the other side until the tire is positioned solely on one portion of the rim, and means pivotally movable about a vertical axis located at said other side of said wheel assembly for breaking the bead between the tire and rim at said other side and for forcing the tire off said one rim portion, said bead breaking means including a pivotally mounted cylinder, a piston movable within said cylinder and a disc operatively connected to said piston, said disc having a dish-shaped configuration with a tapered bevel edge for penetrating between said tire and the edge of said rim during the bead breaking operation.

6. In apparatus for demounting a tire from a two-piece rim, a power shaft, a wheel cone mounted on said power shaft and formed with a plurality of stepped flanges for accommodating various size rims thereon, drive means operatively connected to said power shaft for causing rotation thereof, a lift assembly carrying said drive means and power shaft, lifting means operatively connected to said lift assembly for causing vertical movement thereof, a bead breaking assembly positioned forwardly of said wheel cone and pivotal about a vertical axis with respect thereto and including a rotatable disc for engaging said tire and rim to break the bead between the adjacent tire wall and the rim, and a second bead breaking assembly positioned rearwardly of said wheel cone and pivotal about a vertical axis with respect thereto and including a disc for engaging said tire and rim to break the rear bead therebetween and then to force the tire off said rim, said bead breaking assemblies including hydraulically actuated pistons operatively connected to said discs for moving said discs in a direction toward said wheel cone, whereby said discs may be effective to force the tire in an axial direction relative to said rim.

7. In apparatus for demounting a tire from a wheel assembly, a base, a platform having a well for receiving the tire therein, a lift frame mounted on said base, a power frame assembly mounted on said lift frame for vertical movement thereon, said power frame assembly including a shaft, and motor means drivingly connected to said shaft for causing rotation thereof, means mounted on said base and operatively connected to said power frame assembly for elevating said power frame assembly on said lift frame, said elevating means including a hydraulically actuated pulley, and a sprocket chain engaging said pulley and operatively connected to said lift frame assembly and said base, means mounted on the outer end of said shaft for receiving and locking said wheel assembly thereon, and means mounted on said base adjacent said mounted wheel assembly for removing said tire therefrom.

8. In apparatus for demounting a tire from a two-piece rim, means engaging said rim for rotatably supporting the assembled rim and tire, a bead breaking assembly swivelly mounted about a vertical axis on one side of said assembled rim and tire and including a bead breaking disc that is rotatable about a horizontal axis and is movable into engagement with the assembled rim and tire for breaking the bead therebetween, and for forcing the tire toward the other side until the tire is located solely on one portion of the rim thereof, and a bead breaking assembly swivelly mounted about a vertical axis on the other side of said tire and including a disc rotatable about a horizontal axis and movable into engagement with the other side of said tire for breaking the bead between said tire and rim on said other side and for forcing said tire from engagement with said one portion of said two-piece rim.

9. In apparatus for demounting a tire from a rim, a housing, means rotatably mounted in said housing for rotatably supporting the assembled rim and tire, means elevating said housing, said rotatable means and said assembled rim and tire to a demounting position, a bead breaking assembly swivelly mounted about a vertical axis on one side of said assembled rim and tire and including a bead breaking disc that is rotatable about a horizontal axis and movable into engagement with the assembled rim and tire for breaking the bead therebetween at said one side, a bead breaking assembly swivelly mounted about a vertical axis on the other side of said tire and including a disc rotatable about a horizontal axis and movable forwardly into engagement with the rearmost wall of said tire for demounting said tire from said rim, and means for imparting rotation to the assembled tire and rim.

References Cited in the file of this patent

UNITED STATES PATENTS

| | | |
|---|---|---|
| 1,416,094 | Krauska | May 16, 1922 |
| 1,538,875 | Stevens | May 19, 1925 |
| 1,720,615 | Welch | July 9, 1929 |
| 2,362,967 | Bivans | Nov. 21, 1944 |
| 2,470,534 | Thomas | May 17, 1949 |
| 2,562,995 | Watkins | Aug. 7, 1951 |
| 2,647,564 | Douglass | Aug. 4, 1953 |
| 2,767,781 | Lewis et al. | Oct. 23, 1956 |
| 2,783,830 | Pozerycki et al. | Mar. 5, 1957 |
| 2,840,143 | Skiles | June 24, 1958 |